Patented Mar. 17, 1936

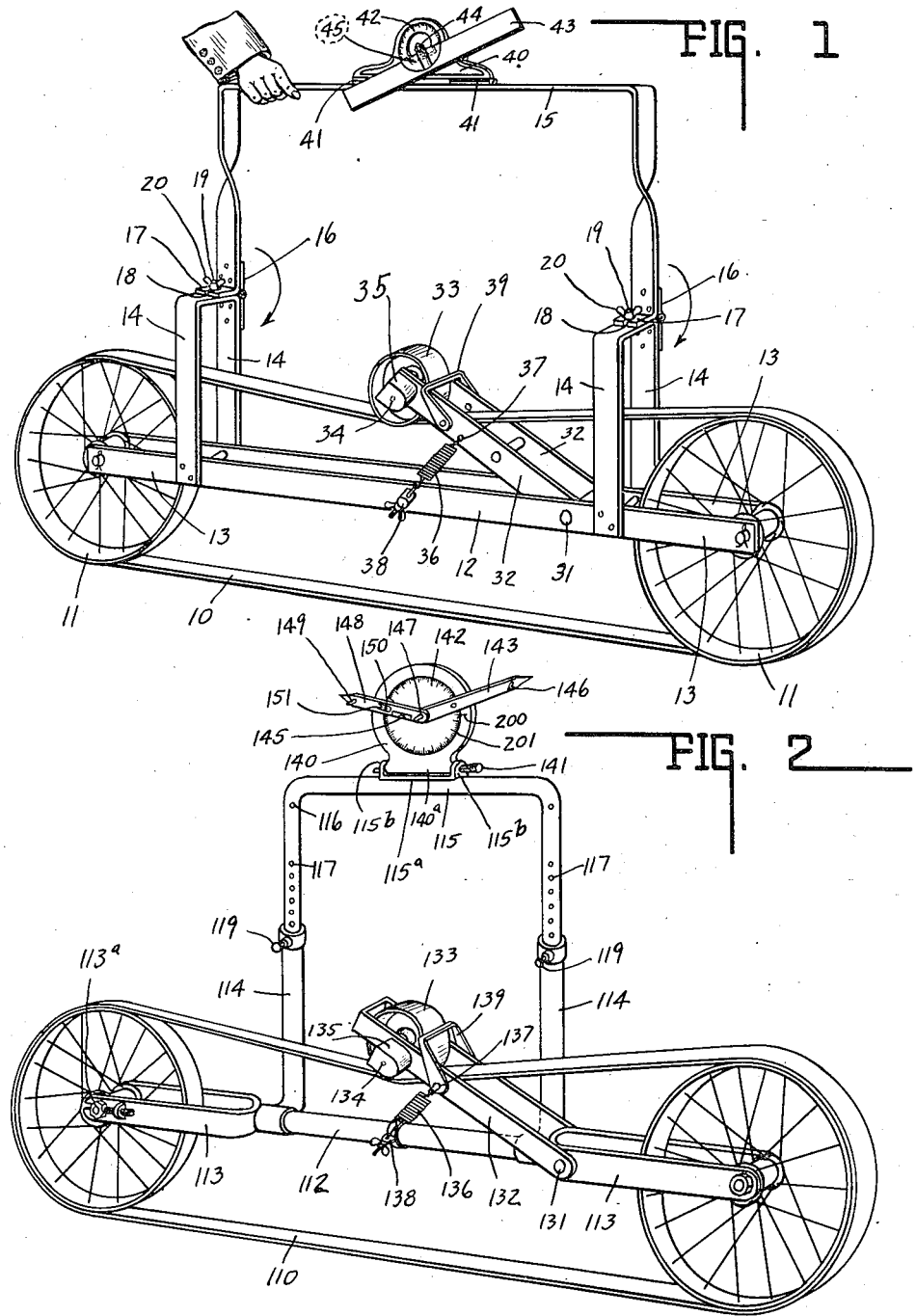

2,033,970

UNITED STATES PATENT OFFICE 2,033,970

ONE-MAN LAND MEASURING APPARATUS

Frank J. Anderson, Frankfort, Ind.

Application May 28, 1934, Serial No. 728,033

13 Claims. (Cl. 33—141)

This invention relates to a land measuring device.

The chief object of this invention is to provide a device which, in accordance with Government regulations, will register as accurately or more so, than average chaining of the distances traversed and which with reasonable accuracy will measure the slope of the side that is to be or has been measured and the included angle between the two sides, and which device is capable of operation by a single individual and at a reasonably rapid speed and which rate of operation is very materially greater than that of chaining and measuring by level and/or transit of slopes and included angles, which chaining as well as transit and level operation, requires at least two individuals for performance.

Measuring devices heretofore have had two primary objections. The first is that in measuring cultivated areas, the bouncing, due to furrows, ditches, and the like, introduces erroneous readings in the length. The second is that devices of this general character have required the use of the equivalent of a compass or angle measuring device and the equivalent of a pendulum or slope measuring device.

The present invention includes a single instrument for measuring both angle and slope.

The present invention consists also of a linear measuring structure which is reasonably accurate and which is not subject to the variations to which previous measuring devices have been subjected when utilized for measuring in cultivated areas before mentioned.

A supplemental feature of the invention is that through the employment of two traction wheels spaced a considerable distance apart, the operator can more readily hold his direction and thus travel the designated line without deviations right and/or left therefrom.

Another feature of the invention consists in the frame being so arranged that it can be readily collapsed into a compact arrangement to facilitate transportation purposes—that is, it can be readily transported in the back end of an automobile, and when the area is to be measured, the frame work can be extended into normal operating position. This extension may be accomplished in at least two ways, both of which are shown in the accompanying drawing, one form of the extension being of a hinged character and the other being of a sliding character.

The combination slope and angle measuring device is associated with the handle or guiding portion of the machine, so as to be more readily accessible for reading and the device is mounted upon a pivotal axis that is substantially parallel to the longitudinal axis of the machine, so that it can be positioned in either of two planes at 90 degrees apart, one for measuring included angles and the other for measuring slopes.

The machine may also be provided with an additional leg so that there is obtained a tripod effect, although the simpler forms of the machine need not be so provided, such additional leg constituting merely an additional support for the machine only when it is used for measuring either slope or angle or both.

The chief feature of the invention consists in the utilization of two spaced wheels over which runs a belt, the lower run of which belt contacts the surface to be measured and the upper run of which contacts a movably mounted measuring pulley, which pulley is associated with a recording device for measuring the distance traversed by the belt.

The movably supported pulley when the weight thereof is not sufficient to secure the desired tension in the belt, may have associated with it a loading device in the form of a spring which may or may not be adjustable, as desired. Adjustability, however, is preferred to compensate for the variation in the length stretch of the belt from time to time. In one form of the invention, the mounting for one of the wheels (and if desired mounting for both of the wheels) is of adjustable character so that the initial tensioning in the belt is obtainable through adjusting the wheel mounting.

To insure accurate recording associated with the belt tensioning and measuring pulley, is a scraper that keeps the surface of the pulley clean and thus insures relatively accurate recording of the belt travel.

The movably mounted pulley, as before suggested, need only be of sufficient weight, together with its movable support, that gravity will maintain the pulley upon the upper run of the belt to insure continuous contact of the pulley surface with the belt and prevent bouncing of the pulley on the belt. To positively prevent bouncing, the spring or tensioning means is provided and this, as before mentioned, has the further incidental feature of tensioning the belt.

The full nature of the invention will be understood from the accompanying drawing and the following description and claims:—

In the drawing, Fig. 1 is a perspective view of one form of the invention.

Fig. 2 is a similar view of another form of the invention.

In the drawing, 10 indicates a belt of the endless variety, 11 a pair of wheels having suitable peripheries over which runs the belt. With the form of the invention shown in Fig. 1, the endless belt, of necessity, must have a seam in it. With the form of the invention illustrated in Fig. 2, the endless belt may be without any seam. A frame indicated generally by the numeral 12 has spaced extensions 13 at each end which constitute a fork and between which and in the ends of which are mounted the respective wheels.

Extending upwardly from the members 12 are two parallel portions 14 united together at their upper ends and the same straddle the belt. A U-shaped handle 15, herein, is shown hingedly connected as at 16 to the members 14 and an extension 17 is slotted as at 18 and receives a bolt 19 carried by the connecting portion of the members 14. A wing nut 20 is adapted to secure the handle structure in operative position. Each end of the handle structure 15, which handle structure is of U-shape, is similarly associated with the main portion of the frame and as shown by the arrows in Fig. 1, the handle structure, when detached by removal of the wing nuts 20, may be folded downwardly so as to lie adjacent the main portion of the frame, thus reducing the overall dimension of the device for transportation purposes.

Pivotally supported at 31 on the frame is a yoke structure, herein shown in the form of two bars 32 suitably spaced apart and at the free ends between said bars is rotatably supported a measuring pulley 33. Measuring pulley 33 has a shaft 34 which is extended laterally through one of the bars and it is adapted to actuate a counting device or register 35 carried by the bar through which the shaft 34 projects.

This counter or register is of standard commercial construction and preferably is of the character wherein it has a reset function and also has the feature of subtraction upon reverse travel. The purpose of this subtraction is that, in the operation of the device, if the operator overruns the line of measurement, the recorder will automatically subtract the overrunning upon retraction of the device along the line of measurement until the exact length of line has been measured.

Normally, the weight of the pulley 33 plus the arms 32, may be sufficient to maintain the pulley in contact with the upper run of the belt. However, to insure contact of the measuring pulley with the belt and, if desired, for tensioning purposes also, to insure positive and direct measurement of the travel of the belt by the pulley, there is provided a constraining means in the form of a spring 36 which is mounted on one of the arms at 37 and is adjustably mounted as at 38 on the frame. The respective mountings, however, may be reversed if desired. This spring tensioning device insures that the measuring pulley maintains contact with the belt at all times and will not bounce from the belt upon the measuring device encountering obstruction in the form of a knob or rock or dropping into a depression, such as a drainage ditch or deep furrows. The spaced wheels straddle short furrows.

A support 40 is hingedly supported as at 41 upon the midportion of the handle extension of the frame. Associated with the support 40 is a circular scale 42 and a slidable rule 43 which is clamped thereto as at 44. The scale is provided with a level 45, shown dotted. When the plane of rotation of the circular scale is vertical and the level 45 is horizontal, then the slope of the line represented by the lower run of the belt 10 can be readily measured. The circular scale and rule and standard structures and the clamping connections are of conventional character, in fact, the scale and rule combination is a standard tool unit.

When the support 40 is positioned at right angles to that shown in Fig. 1—that is, the plane of rotation of the circular scale being approximately horizontal—then the midportion of the member 15 being directed along the side of the surface that has just been measured or the side to be measured and the member 43 being directed along the side that is to be measured or has been measured, respectively, then the circular scale can be read for the included angle between the sides.

To insure accuracy in the actual recording of distances and due to the fact the belt is contacting earth and the like, and inasmuch as only belt travel is measured, it has been found highly desirable to insure a clean belt contacting surface upon the measuring pulley, and herein a U-shaped scraper 39 is pivotally supported upon measuring pulley supporting arms, and continuously engages or is ready to engage the belt contacting surface of the measuring pulley to insure the continuous cleaning thereof. It has been found that without this cleaning contact, under many conditions the recording will not correspond with the actual distances as determined by a transit but with this scraper applied, the recording is usually about $\frac{1}{10}$ of and always less than one-half of one percent in error of the actual distance, as determined by a transit, which is, as is well known, materially less than that determined by average unskilled chaining, both of which operations—that is, transit measuring and chain measuring requires two operators, whereas the present invention requires but a single operator. The Government now permits an error of one percent, and accepts unskilled chaining records.

In Fig. 2 there is illustrated a modified form of the invention and in said figure, numerals of the one hundred series indicate like or equivalent parts. In this form of the invention, however, one of the pivotal supports for the wheel terminates in an adjustable bearing 113a and with this device a one piece, seamless, endless belt may be employed, the tension therein being primarily taken up by the adjustment indicated at 113a.

In this form of the invention, the anchorage for the spring 136 and the support for the scraper 139 is the common portion 137. Likewise, in this form of the invention, the collapsible frame is illustrated as of a telescopic or slidably extensible character, the portions 114 constituting tubes and the depending arms of the U-shaped portion 115 having a plurality of openings 117 which provide for adjustable positioning of the portion 115, so that it always is substantially parallel to the portion 112, just as the portion 15 is parallel to the portion 12 in the form of the invention shown in Fig. 1.

A locking device 119 consists of a spring pin or the like, adapted to register with one of the holes 117 or the hole 116. When the hole 116 is utilized, the device is collapsed for transportation. This form of the invention insures that, due to the parallelism of the tubes 114, the portion 115 must be secured in parallel relation to portion 112.

In this form of the invention also, a modified form of slope and angle measuring mechanism is illustrated.

The operation of both forms of the invention may be briefly set forth as follows:— When the front wheel ground contact is determined to be the initial point of contact for the line of measurement, the device is pushed by the operator along the line to be measured until the front wheel or any other corresponding part originally selected registers with the end of that line. Then the reading, as determined by the register, is taken and that is the correct distance in feet.

If the included angle between the last side to be measured and the first side to be measured has not been taken, as well as the slope of the last side, then upon arriving at the second station, which is at the end of the first line for that side of the field, the machine is held so that in Fig. 1 the machine indicates one line of travel and the pointer or rule 43 indicates the other and then the included angle is measured. This gives the included angle between the side measured and the side to be measured. The support in that measurement lies substantially horizontal. It is then elevated into a vertical plane and the circular scale turned until the level shows that member 43 is horizontal and then the angular departure between the scale and some fixed zero point, indicates the slope of the side in question.

The form of the invention shown in Fig. 2 is considerably more accurate. The general method of operation, however, is identical.

It is to be observed the element of slippage between the belt and the wheels is unimportant or immaterial, whereas the element of slippage between the measuring pulley and the belt is important and must be eliminated.

It is also to be observed the element of tension in the belt is not so important. In other words, all that is necessary is that there be sufficient tension in the belt so there is no undue amount of slack therein so that the measuring pulley has a peripheral travel equal to the distance travelled by the belt.

In operation, however, the operator has only one precaution to observe and that is to see that the device as a whole is not skidded along the line of measurement but is rolled along the same— that is the belt travels an amount of equal to the linear distance to be measured.

If desired, an additional support may be provided that would be suitably associated with the handle 15 and extend to the ground for ground engagement and in this way, said support and the frame would constitute a tripod for the slope and angle measuring arrangement, although normally, such additional support by the more experienced operator would not be utilized. It is, however, comprehended within the broad disclosure of this invention.

While the invention has been described in great detail in the foregoing specification and various modifications thereof have been both illustrated and described, the same is to be considered as illustrative and not restrictive in character. The said modifications suggested, illustrated and/or described, as well as many others which will readily suggest themselves to persons skilled in this art, are all to be considered within the broad scope of this invention, reference being had to the appended claims.

The invention claimed is:—

1. In a measuring device, the combination of a pair of spaced wheels in tandem relation, a belt passing over both wheels, the lower run of which is adapted to engage the surface to be measured, a frame supporting said wheels, a measuring pulley suitably supported by said frame and engaging the upper run of the belt, and a recording device operable by said pulley for recording the distance traversed by the belt.

2. A device as defined by claim 1, characterized by the addition of means pivotally supporting the measuring pulley upon the frame, and means normally constraining the pulley into engagement with the belt.

3. A device as defined by claim 1, characterized by said measuring pulley being normally constrained toward belt engagement.

4. A device as defined by claim 1, characterized by the addition of means pivotally supporting the measuring pulley upon the frame, said supporting means straddling the upper run of said belt for insuring pulley contact therewith and said pulley being constrained toward belt engagement.

5. A device as defined by claim 1, characterized by the addition of means pivotally supporting the measuring pulley upon the frame, means normally constraining the pulley into engagement with the belt, and means associated with said measuring pulley for insuring a clean, belt contacting, surface.

6. A device as defined by claim 1, characterized by said measuring pulley being normally constrained toward belt engagement, and means associated with said measuring pulley for insuring a clean, belt contacting, surface.

7. A device as defined by claim 1, characterized by the addition of means pivotally supporting the measuring pulley upon the frame, said supporting means straddling the upper run of said belt for insuring pulley contact and said pulley being constrained toward belt engagement, and means associated with said measuring pulley for insuring a clean, belt contacting, surface.

8. A device as defined by claim 1, characterized by the addition of means asociated with said pulley for insuring clean, belt surface, engagement.

9. A device as defined by claim 1, characterized by the frame being of collapsible character.

10. A device as defined by claim 1, characterized by the frame being of collapsible character, said collapsible character being of the hinge type.

11. A device as defined by claim 1, characterized by the frame being of collapsible character, said collapsible character being of the slidably extensible type.

12. A device as defined by claim 1, characterized by the addition of means including an angle measuring scale and a level, and means pivotally supporting said scale and level upon said frame for angle and slope measurements, the axis of said pivotal support being parallel to the longitudinal axis of the frame.

13. A device as defined by claim 1, characterized by the addition of means including an angle measuring scale and a level, and means pivotally supporting said scale and level upon said frame for angle and slope measurements, the axis of said pivotal support being parallel to the longitudinal axis of the frame, the scale and level supporting portion of the frame constituting a handle for moving and guiding the machine.

FRANK J. ANDERSON.